United States Patent [19]
Ueda

[11] 3,860,963

[45] Jan. 14, 1975

[54] PLURAL TAPE RECORDER CHANGE-OVER MECHANISM FOR SIMULTANEOUS OR SEQUENTIAL OPERATION

[75] Inventor: Tateki Ueda, Tokorozawa, Japan

[73] Assignee: Pioneer Electronic Corporation, Tokyo, Japan

[22] Filed: Mar. 14, 1973

[21] Appl. No.: 340,987

[30] Foreign Application Priority Data

Mar. 21, 1972 Japan .......................... 47-32375[U]

[52] U.S. Cl. ..................... 360/92, 179/6 R, 360/105

[51] Int. Cl. ......................... G11b 15/68, G11b 5/54

[58] Field of Search .......... 179/100.2 MD, 2 S, 6 R; 360/92, 105

[56] References Cited

UNITED STATES PATENTS

| | | | |
|---|---|---|---|
| 2,928,898 | 3/1960 | Salzberg | 179/100.2 S |
| 3,445,600 | 5/1969 | Todd | 179/6 R |
| 3,484,955 | 12/1969 | Lippett | 179/100.2 MD |
| 3,649,762 | 3/1972 | Okamura | 179/6 R |
| 3,662,121 | 5/1972 | Cruger | 179/100.2 S |
| 3,703,041 | 1/1972 | Kohtani | 179/100.2 MD |

*Primary Examiner*—Bernard Konick
*Assistant Examiner*—Stewart Levy
*Attorney, Agent, or Firm*—Sughrue, Rothwell, Mion, Zinn & Macpeak

[57] ABSTRACT

In a tape recorder having provisions for two magnetic tapes which may be operated independently or in a pre-determined sequence or relationship, a device for changing back and forth from a mode in which one of the tapes is first reproduced and then the other records to a mode in which one tape is reproduced while the other simultaneously records. This device is particularly adapted for use with automatic telephone answering devices.

3 Claims, 4 Drawing Figures

PLURAL TAPE RECORDER CHANGE-OVER MECHANISM FOR SIMULTANEOUS OR SEQUENTIAL OPERATION

BACKGROUND OF THE INVENTION

1. Field of the Invention

This invention relates to tape recorders, such as automatic telephone answering devices, having provisions for two magnetic tapes which may be operated, independently or in a pre-determined sequence or relationship.

2. Description of the Prior Art

Heretofore, in automatic telephone answering devices having two separately mounted tapes, one provided to record and reproduce the master's message and the other provided to record and reproduce the messages left by callers, the running of the tape bearing the master's pre-recorded message has been started by the calling signal of the telephone and the running of the tape provided to record the messages left by callers has been started automatically after the running of the first tape has been stopped automatically when a sensing mechanism has detected the end of the master's message. The second tape reocrds for a pre-determined period of time, usually one or two minutes, and the first tape is returned to the beginning of the master's message either while the second tape is running or after it has come to a stop. This sequence is repeated every time the telephone is dialed, and the master can hear the messages from the callers when he reproduces the tape thus recorded.

However, it has been found that, if the caller is not familiar with the operation of the automatic telephone answering device, he will frequently start his message while the first tape is still reproducing the message bearing the master's message. When this happens, the first part of the caller's message is not recorded, and the function of the automatic telephone answering device is not fully accomplished.

SUMMARY OF THE INVENTION

The present invention is intended to overcome the above described deficiency of the prior art. It comprises a device for changing back and forth from the conventional mode, in which one of the tapes is first reproduced and then the other records, to a mode in which one tape is reproduced while the other simultaneously records. The first mode can then be employed when only calls from persons familiar with the use of automatic telephone answering devices are anticipated, thereby saving unnecessary recording on the second tape, and the second mode can be employed when calls from persons not familiar with the use of automatic telephone answering devices are anticipated, thereby ensuring that their entire messages will be recorded.

BRIEF DESCRIPTION OF THE DRAWINGS

All of the attached FIGS. are plan views of selected elements of an embodiment of the present invention. In all FIGS. the covers of the cartridge and the cassette have been removed for the sake of clarity.

DETAILED DESCRIPTION OF A PREFERRED EMBODIMENT

Figure 1:
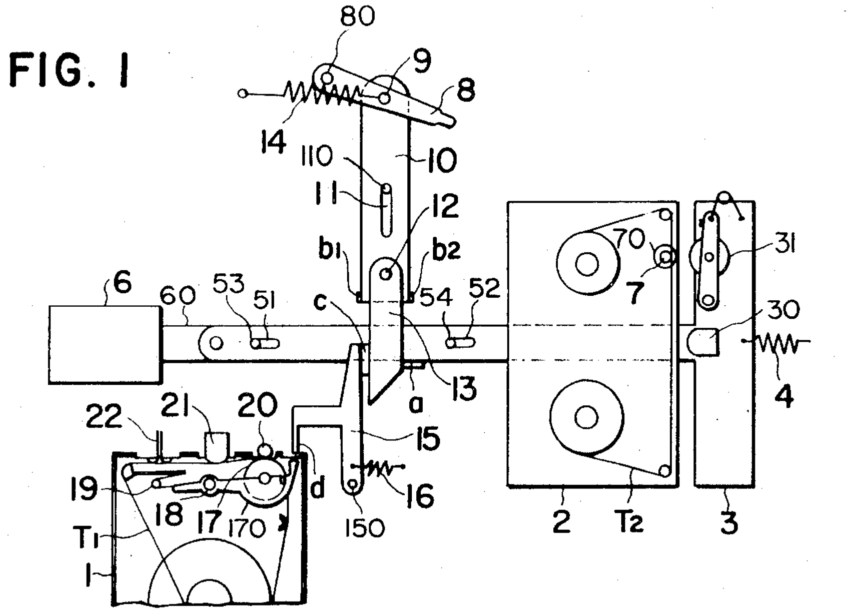
FIG. 1 shows the device in its first-mode, ready state.

Although it will be apparent to those skilled in the art that the present invention can be used whenever it is desirable to construct a tape recorder having provisions for the coordinated operation of two magnetic tapes, it will be illustrated here by a description of an embodiment adapted for use with an automatic telephone answering device because that is the commercial field in which the invention seems likely to be most useful.

The illustrated embodiment, which is the same in all figures, comprises a cartridge 1 of the endless tape type containing a tape T1 which serves as the master's tape, and a reel-to-reel type cassette 2 containing a tape T2 which serves as the callers' tape. Both the cartridge 1 and the cassette 2 are mounted at pre-determined positions in a tape recorder. A movable T-shaped plate 3 is slidably mounted with the underside of its head facing the head of the cassette 2. The tape $T_2$ in the T-shaped plate 3 carries a magnetic head 30 and a pinch roller 30' , and the tail has elongated holes $5_1$ and 52 which engage guide pins 53 and 54 and a stop a which engages a pawl 13. The bottom of the T-shaped plate 3 is connected to the movable shaft 60 of the plunger 6. The plate 3 is urged rightward as viewed in the drawings by means of a spring 4. A capstan 70 passes through a hole 7' in the cassette 2 and engages the tape T2 therein.

A lever 80 pivotally mounted on a pin 8' is coupled through another pin 9 to a bar 10 having an elongated hole 11 which engages a guide pin 110. The pawl 13 is pivotally mounted on the bar 10 by means of a pin 12, and the movement of the pawl 13 is restricted by stops $b_1$ and $b_2$ provided at the end of the bar 10. One end of a spring 14 is attached to the lever 8 (conveniently, but not necessarily, via the pin 9), and the other end is attached to the chassis of the tape recorder. The spring 14 functions as an over-center device, pushing the upper end of the hole 11 against the guide pin 110, when the lever 8 is in the position shown in FIGS. 1 and 2 and pulling the lower end of the hole 11 against the guide pin 110 when the lever 8 is in the position shown in FIGS. 3 and 4.

A crank lever 15 pivotally mounted on a pin 150 is urged in the clockwise direction by means of a tensile spring 16, but is held to a position in which one end *c* of the crank lever 15 abuts against the pawl 13. Another end *d* faces the cartridge 1 for cooperation therewith, as hereinafter described.

A pinch roller 17 in the cartridge 1 is supported in a pinch-roller holder 170 which is in turn urged in a counterclockwise direction around a pin 18 by a clip spring 19, causing the pinch roller 17 to abut against a capstan 20. Numeral 21 designates a magnetic head, and numeral 22 designates a sensing pole.

The operation of the illustrative embodiment of the present invention will now be described with reference to the attached drawings. The first mode, depicted in FIGS. 1 and 2, will be described first, then the second mode, depicted in FIGS. 3 and 4.

Figure 2:
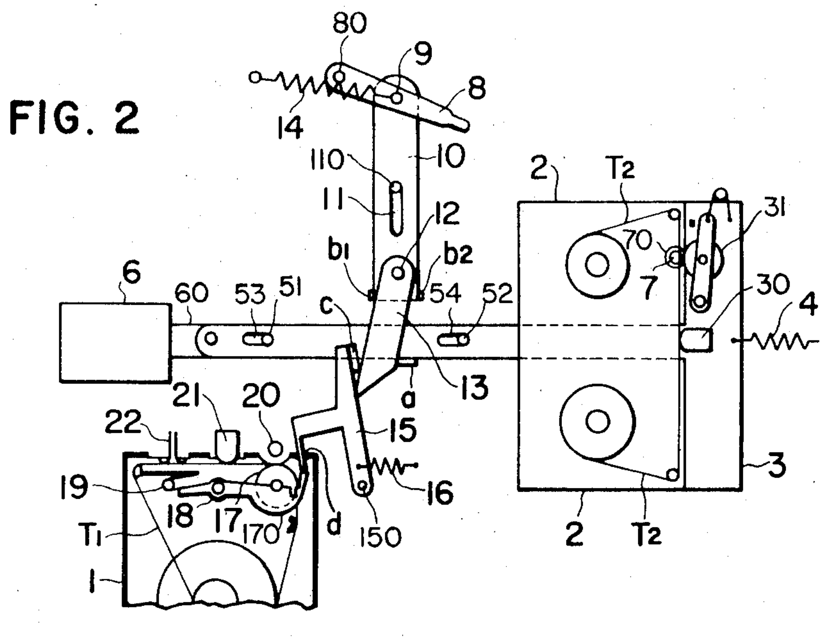
FIG. 2 shows the device in its first-mode, operating state.

The two capstans 7 and 20 are rotated by a motor (not shown) which is started when the telephone to which the device is connected is called. Initially the device is in the condition shown in FIG. 1, and, since the pinch roller 17 is in contact with the capstan 20, the message on the tape T1 is reproduced. When the end of the message on the tape T1 is sensed by the sensing pole 22, the plunger 6 is automatically moved to the left in the figures by conventional means (not illustrated). This phase of the device's operation is illustrated in FIG. 2. When the plunger moves to the left, the T-shaped plate 3 is drawn leftwardly against the urging of the spring 4, and the pinch roller 31' is brought into contact with the tape T2 where it passes the capstan 7. The tape T2 then begins to run, and the message of the caller, if any, is recorded on the tape T2. At the same time that the pinch roller 31' is brought into contact with the tape T2, the pawl 13 is pushed leftwardly by the stop *a*, thereby rotating it clockwise around the pin 12. The rotation of the pawl 13 causes the end *c* of the crank lever 15 to be rotated counterclockwise about the pin 150, and the other end *d* of the crank lever 15 depresses an end of the pinch-roller holder 170. As a result, the pinch roller 17 is released from the capstan 20, and the running of the tape T1 is thereby stopped.

The plunger 6 is returned to its initial position after a predetermined period of recording to the tape T2, and the rotation of the capstan is stopped. The automatic telephone answering device is thus brought back to its original state as shown in FIG. 1.

In the above-described operation of the device, the recording of the caller's message on the tape T2 has been started after the termination of the reproduction of the tape T1, as in the conventional, prior-art automatic telephone answering devices. However, in the illustrated embodiment of the present invention, there is provided a mechanism responsive to movement of the lever 8 which may be used when a call from a person not familiar with the automatic telephone answering device is anticipated. On such occasions, the lever 8 is rotated counterclockwise from the position shown in FIGS. 1 and 2 to the position shown in FIGS. 3 and 4. This rotation takes place initially against the resilient force of the spring 14. The end of the spring 14 attached to the lever 8 is moved from beneath to above a line connecting the other end of the spring 14 and the pivot pin 80, of the lever 8. As a result, the bar 10 is translated upwards and rotated clockwise until the lower end of the elongated hole 11 abuts against the guide pin 110. Since it is attached to the bar 10, the pawl 13 is also raised upward. At the same time, the electronic control circuit (not shown) is changed to actuate the plunger 6 when the calling signal is received, rather than at the end of the master's message, as in conventional automatic telephone answering devices.

Figure 3:
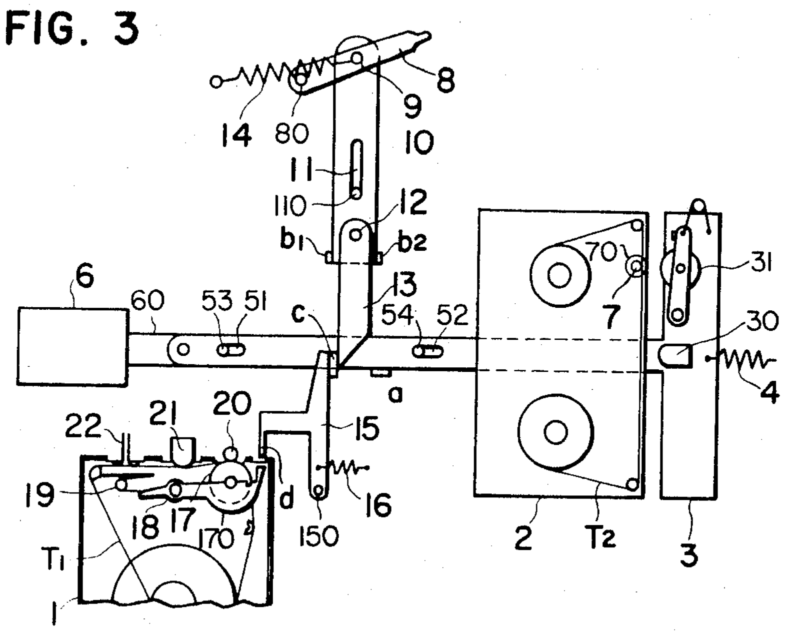
FIG. 3 shows the device in its second-mode, ready state.
Figure 4:
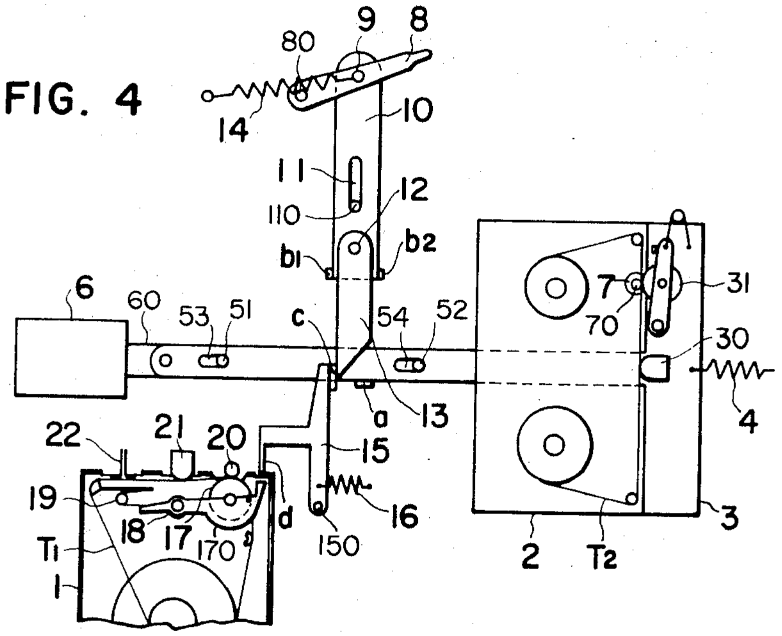
FIG. 4 shows the device in its second-mode, operating state.

When the device is in the second mode, as described above, the T-shaped plate 3 is shifted leftward to the position shown in FIG. 4 immediately upon receipt of the calling signal. Therefore. The pinch roller 31' is urged against the capstan 7 and the tape T2 is put in motion to be ready to record the message of the caller at the same time that the master's message is played. The playing of the master's message is simultaneously initiated in the following manner: since the stop *a* does not come into contact with the pawl 13, the end *d* of the crank lever 15 does not depress the pinch-roller holder 170, and the tape T1 is also put in motion, reproducing the recorded message thereon. When the sensing pole 22 senses the end of the recorded message, the motor operating the capstan 20 is stopped and the tape T1 is returned to its initial position, as before. After a predetermined additional period, the plunger 6 is returned to its ready state and the capstan 7 is stopped. Thus the automatic telephone answering device is brought back to its original state as shown in FIG. 3.

As described hereinabove, a counter measure against an anticipated caller who is not familiar with automatic telephone answering devices can be taken very easily by simply shifting a lever against the resilient force of a spring. Furthermore, since the reproduction and recording can be carried out simultaneously on two separate tapes, the tape in the cartridge may be employed for reproducing inquiries such as "Who are you?", "What time is it?", "What do you want?", and the like recorded thereon at pre-determined time intervals, and the other tape in the cassette may be used for recording the answers. The inquiries may be transferred directly to the track on the cassette tape used to record the caller's answers, or they may be transferred on to a separate track on that tape (in which case provision should be made for optional simultaneous or separate reproduction of the two tracks), or they may be left unrecorded (in which case the master must rely upon his recollection of the questions and the intervals between the caller's responses to make sense of their answers).

CAVEAT

While the present invention has been illustrated by a detailed description of a preferred embodiment thereof, it will be obvious to those skilled in the art that various changes in form and detail can be made therein without departing from the true scope of the invention. For that reason, the invention must be measured by the claims appended hereto and not by the foregoing preferred embodiment.

What I claim is:

1. In a tape recorder having provision for two magnetic tapes which may be operated independently or in a pre-determined sequence or relationship, the improvement comprising means for changing back and forth from a first mode in which said tapes are operated upon sequentially to a second mode in which said tapes are operated upon simultaneously, said means comprising:

a. a plate slidable in a linear manner;
b. a first pinch roller mounted on said plate in spaced relationship to a first one of said tapes;
c. means for urging said plate away from said first tape, whereby said first pinch roller is not normally in contact with said first tape;
d. a lever manually operable by the operator of said tape recorder;
e. a bar pivotably connected to said lever at one end of said bar;
f. a pawl pivotably connected to the other end of said bar;
g. means for urging said lever into either a first position or a second position;
h. a stop mounted on said plate and adapted to engage said pawl when said lever is in said first position but not when said lever is in said second position;
i. means for limiting the arc in which said pawl can pivot;

j. a second pinch roller pivotably mounted and normally urged into contact with the second of said tapes;

k. a pivotably mounted crank lever, one end of which engages the free end of said pawl and another end of which is in spaced relationship to said second pinch roller, whereby said second pinch roller may be pivoted out of contact with said second tape by a movement of said pawl, which movement is in turn caused by the movement of said stop when said lever is in its first position; and l. means for sliding said plate in a linear manner whereby said first pinch roller is brought into contact with said first tape and, if said lever is in its first position but not if said lever is in its second position, said stop causes said pawl to pivot, thereby causing said second pinch roller to be pivoted out of contact with said second tape.

2. In a tape recorder having two castans, two pinch rollers, and two magnetic heads for operating two magnetic tapes respectively, the improvement comprising:

a. a first pinch roller mounted on a slide plate and means for sliding said slide plate so that said first pinch roller is brought into contact with a first tape;

b. a changing mechanism for changing the tape recorder between a first mode for operating a first tape and a second tape sequentially and a second mode for operating a first tape and a second tape simultaneously;

c. means for maintaining said changing mechanism in either said first mode or said second mode;

d. a clutch mechanism operated by said changing mechanism and operatively connected to said slide plate for releasing a second pinch roller from a second tape in said first mode; and e. means for releasing said second pinch roller from said second tape by engaging said clutch mechanism in said first mode.

3. A device as claimed in claim 2 wherein said changing mechanism comprises:

a. plate slidable in a linear manner;

b. a first pinch roller mounted on one of said heads in spaced relationship to a first one of said tapes;

c. means for urging said plate away from said first tape, whereby said first pinch roller is not normally in contact with said first tape;

d. a lever manually operable by the operator of said tape recorder;

e. means for urging said lever into either a first position or a second position;

f. a second pinch roller pivotably mounted and normally urged into contact with the second of said tapes;

g. a clutch mechanism operated by said lever and operatively connected to said slide plate for releasing said second pinch roller from said second tape in said first position;

h. means for connecting said lever and said clutch mechanism;

i. a pivotably mounted crank lever, one end of which engages said clutch mechanism and the other end of which is in spaced relationship to said second pinch roller, whereby said second pinch roller may be pivoted out of contact with said second tape by a movement of a pawl, which movement is in turn caused by the movement of said plate when said lever is in its first position; and j. means for sliding said plate in a linear manner whereby said first pinch roller is brought into contact with said first tape and, if said lever is in its first position, said second pinch roller is pivoted out of contact with said second tape by means of said clutch mechanism and said crank lever.

* * * * *